United States Patent [19]
Herrington

[11] 3,959,425
[45] May 25, 1976

[54] METHOD FOR EXTRUDING TUBULAR THERMOPLASTIC FILM

[75] Inventor: F. John Herrington, Holcomb, N.Y.

[73] Assignee: Mobil Oil Corporation, New York, N.Y.

[22] Filed: Aug. 14, 1974

[21] Appl. No.: 497,784

Related U.S. Application Data
[62] Division of Ser. No. 366,388, June 4, 1973, Pat. No. 3,867,083.

[52] U.S. Cl................................. 264/89; 264/95; 264/290 R
[51] Int. Cl.².......................................... B29D 7/22
[58] Field of Search............ 264/95, 89, 237, 290 R; 425/326 R, 72

[56] References Cited
UNITED STATES PATENTS

| | | | |
|---|---|---|---|
| 3,167,814 | 2/1965 | Corbett................................ | 425/72 |
| 3,507,006 | 4/1970 | Princen................................ | 425/72 |
| 3,551,540 | 12/1970 | Pellicciari et al...................... | 264/95 |
| 3,568,252 | 3/1971 | Masuda et al........................ | 264/95 |
| 3,754,067 | 8/1973 | St. Eve et al........................ | 264/95 |
| 3,775,523 | 11/1973 | Haley................................ | 264/95 |
| 3,819,790 | 6/1974 | North et al.......................... | 425/72 |
| 3,835,209 | 9/1974 | Karabedian.......................... | 264/95 |

*Primary Examiner*—Jeffery R. Thurlow
*Attorney, Agent, or Firm*—Charles A. Huggett; James D. Tierney

[57] ABSTRACT

A method is provided for preparing continuous, seamless blown thermoplastic film tubing by extruding a melt of the thermoplastic through an annular orifice into an instantaneous cylindrical shape, inflating the film tube thus formed and cooling such inflated tubing. In the process, the extruded tube while still plastic is passed through an external cooling and shaping means having a multi-perforated air ring shaped in congruance to the desired shape of the inflating tube. A major advantage of this process is that production speeds can be increased while maintaining bubble stability.

4 Claims, 3 Drawing Figures

METHOD FOR EXTRUDING TUBULAR THERMOPLASTIC FILM

This is a Division of application Ser. No. 366,388, filed June 4, 1973, now U.S. Pat. No. 3,867,083 issued on Feb. 18, 1975.

This invention relates to a method and apparatus for preparing continuous, seamless blown thermoplastic film tubing by melt extruding. It more particularly relates to such method and apparatus which produce a thin wall film or sheeting at higher speeds with improved transverse direction gauge uniformity.

It is well known in the plastics art to continuously melt extrude thermoplastics through an annular orifice, apply internal fluid pressure to the tube thus extruded and thereby expand the tube and reduce the wall thickness thereof to appropriate dimensions while cooling and solidifying the extruded thermoplastic. Thereafter, the tubing is flattened between pinch rolls into a double thickness. The flattened double thickness may be wound into a cylindrical roll for storage and subsequent use as a tube, the tubing may be split to form a single thickness sheet of double width wound into one roll, or two single thickness sheets wound into two separate rolls.

While useful tubing or sheeting may be and has been commercially produced by this method, under certain circumstances such product has a disadvantageous character of gauge non-uniformity, that is the thickness of the film is not uniform. Due to this non-uniformity in wall thickness (gauge), upon winding of the flattened tubing, an uneven, humped roll is obtained. In the case of plastics having a cold flow, the winding tension stretches the film over the humps so that when the film is unwound it does not lay flat, has ripples or billows therein, and thus requires special precautions in the printing, conversion and other uses thereof. Conventionally such problems are ameliorated by rotating the die and/or any cooling ring being used.

These gauge variations also tend to use more pounds of resin per square foot of produced film because a higher average gauge must be maintained in order to maintain a given minimum gauge. Therefore, it is desirable to reduce gauge variation.

One of the major problems in this art is to cool the extruded bubble of thermoplastic material. Production rate for any given tube (bubble) size is limited by the character of the bubble being extruded. Thus, under a given set of operating conditions, increasing extruder output will cause the thermoplastic to be formed into a tube at a higher rate but since the heat exchange character of the system will not have changed, it will also cause a rise in the height of the frost line (that is the line where the extruded tube turns from molten to solid character). This in turn causes an increase in the instability of the extruded bubble because its unsupported molten length has become too long. Supporting the film bubble in general permits increased cooling air impingement and therefore increased extrusion speeds.

Accordingly, an object of this invention is to provide an improved method and apparatus for producing blown tubing from thermoplastic materials, particularly polymers of 1-olefins, e.g. polyethylene.

Another object is to provide an improved method and apparatus for producing thin thermoplastic film having improved physical properties, such as gauge uniformity.

A further object of this invention is to produce thin thermoplastic film of good physical properties at higher speeds than were heretofore possible.

These and further objects of this invention will become apparent to those skilled in the art from the following discussion, appended claims and accompanying drawings.

Understanding of this invention will be facilitated by reference to the drawing in which.

Figure 1:
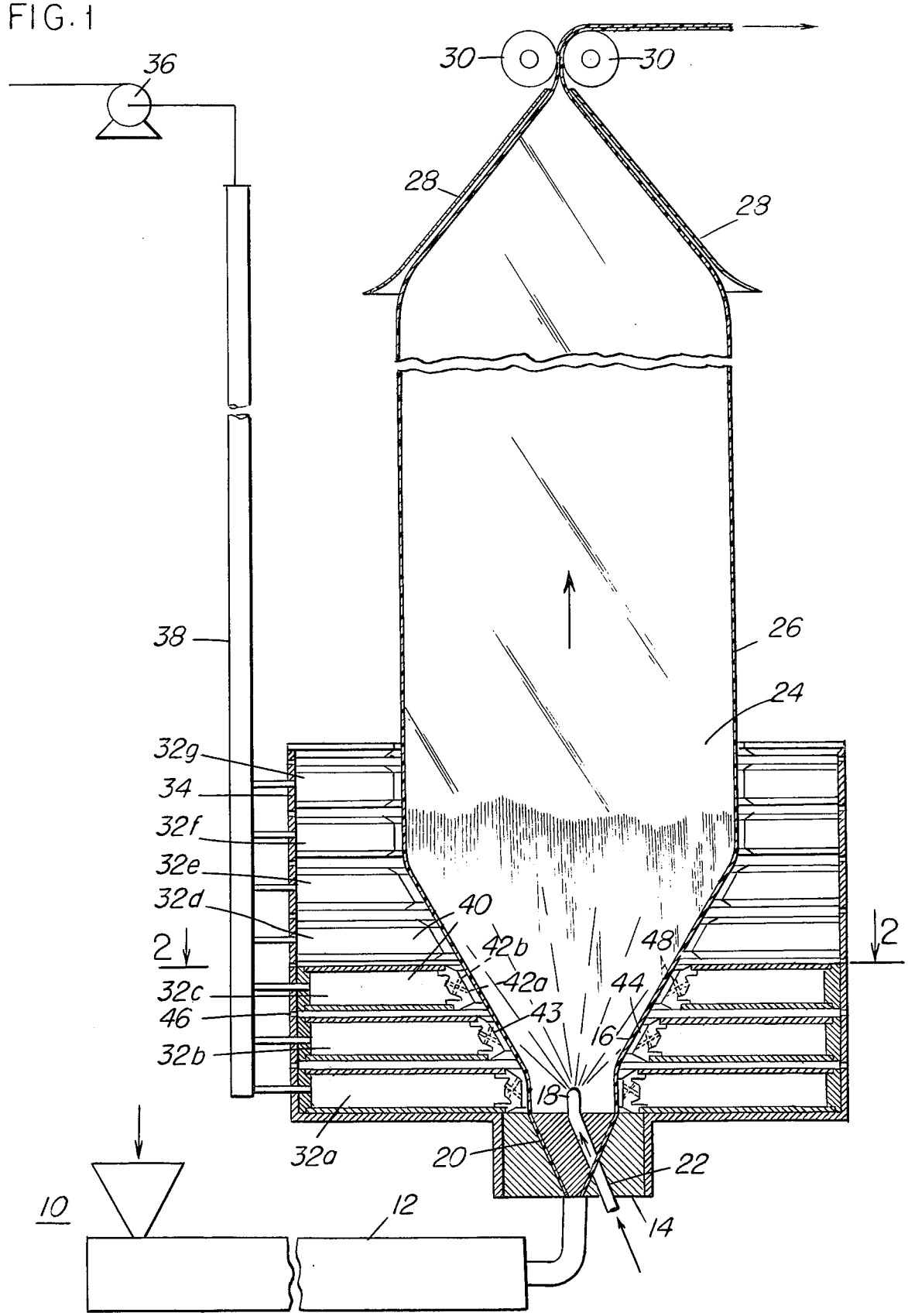
FIG. 1 is a front elevation, in section of a typical tubular extrusion apparatus embodying the features of the present invention.
Figure 2:
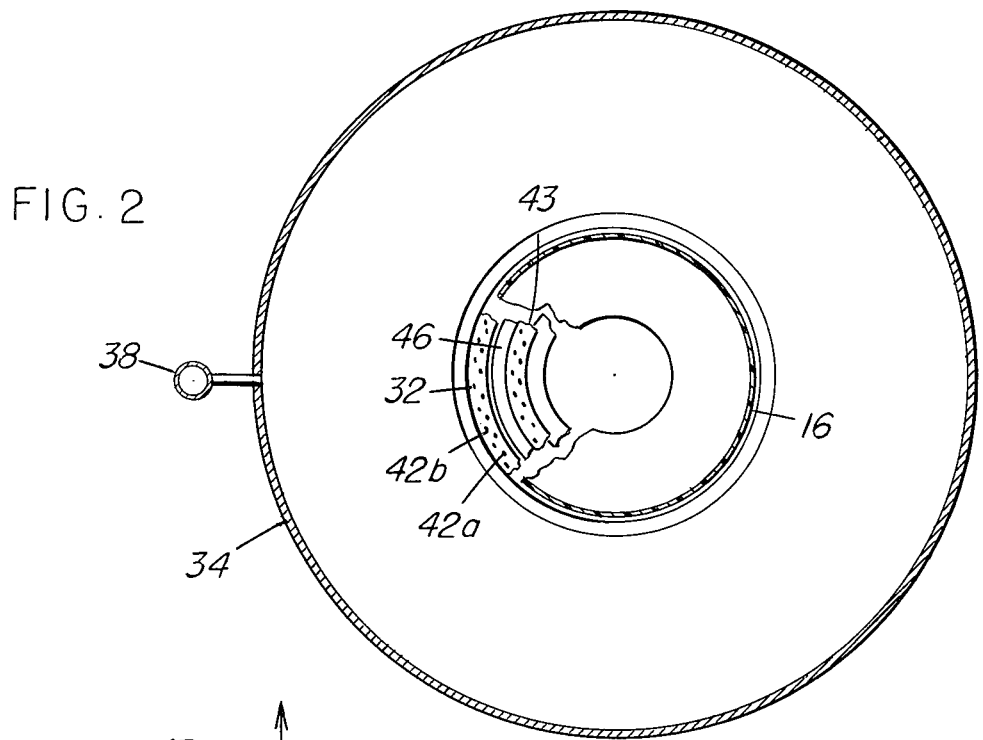
FIG. 2 is a section view taken on line 2—2 of FIG. 1.
Figure 3:
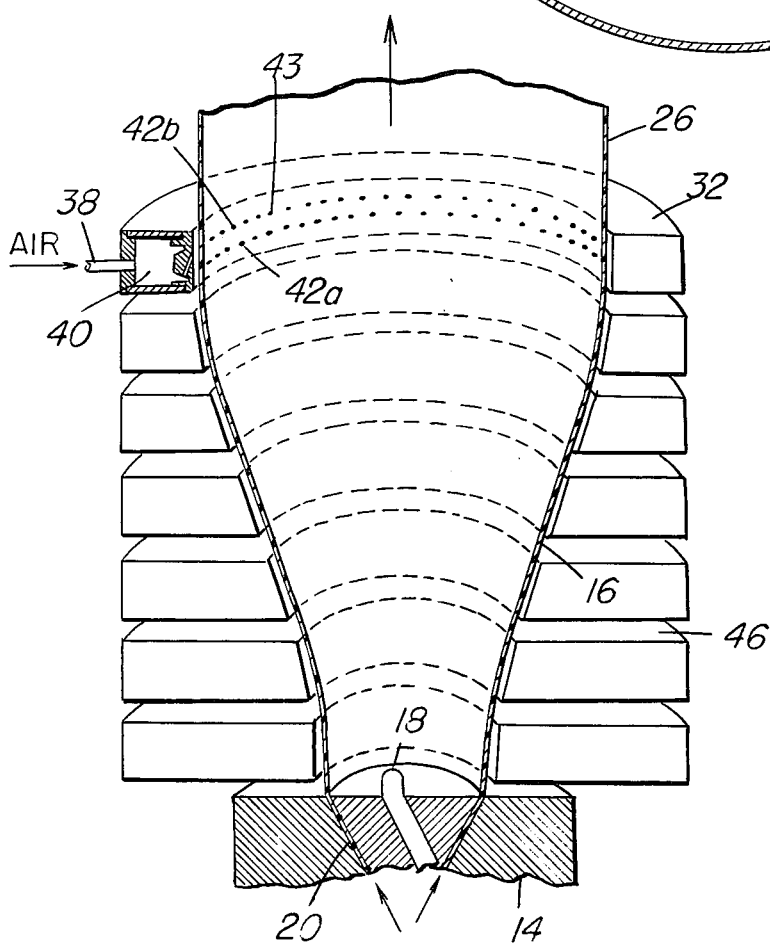
FIG. 3 is an enlarged view of the cooling ring portion of the apparatus of FIG. 1 embodying the features of the present invention.

In accord with and fulfilling these objects, one aspect of this invention resides in a novel apparatus which is useful in tubular melt extrusion of thermoplastics. This apparatus comprises conventional extruder and annular extrusion die means and conventional internal air, or other fluid, introduction means axially mounted in the annular die. The apparatus also includes conventional pinch roller means spaced from the annular die a sufficient distance so that the tube pressing therethrough is sufficiently cooled to be substantially solid and non-tacky. Further conventional portions of the apparatus include means to provide sufficient air or other fluid inside the extruded bubble to at least balance the ambient atmospheric pressure and permit the extrudate to form the intended bubble.

One of the important features of the apparatus of this invention is the use of means for imposing a particular configuration on the extruded tube of thermoplastic material from the time it issues from the annular die to the time, downstream thereof, at which it is more in the solid, substantially non-plastic state. This configuration imposition means comprises a housing of generally diverging, e.g. conical, paraboloid or other similar, shape. It is not intended by this characterization of this configuration imposition housing that such be limited to an exact geometric reproduction of such mathematical functions as have been mentioned. Rather these are given as illustrative of the general type of configuration which is useful in this invention. It can be generally stated that this housing diverges at some rate from an initial, upstream position proximate to and concentric about the annular extrusion die to progressively more downstream positions less proximate to but still concentric with the annular extrusion die.

The housing referred to above has multiple rows of channels therethrough each terminating in an aperture on the surface thereof directed toward the extruded tubing. Each row of apertures lies along a plane generally normal to the axis of the annular extrusion die. Each row of channels and of course their corresponding apertures, is associated with one next adjacent row of channels and apertures so that such rows cooperate in pairs. The individual apertures in each of said pair of rows are streamwisedly directed apart at a very wide angle, in fact preferably the widest angle possible considering all other mechanical constraints as will become apparent from this entire specification. The axes of these cooperating aperture and channel pairs are positioned at a very small acute angle with respect to the surface of the thermoplastic tube extruded from the referred to annular die. Although it is probably the most efficient configuration, the referred to channels need not be cylindrical in shape but can be a converging nozzle or other configuration. It is only important that these channels cause fluid flowing therethrough to diverge preferably to a maximum extent, upon emergence from each aperture pair.

Means are provided for forcing air or some other appropriate fluid through the channels and out the apertures generally toward the extruded thermoplastic tubing. Outward passage means are also provided between the aforementioned pairs of aperture rows for the air or other fluid to escape. Thus a circulatory system is provided forcing fluid from the outside toward the extruded tube, passing the fluid along the extruded tube and then passing the fluid back to the outside. Where the fluid is air, the atmosphere can be a suitable reservoir to pump from and to. If other fluid is used, a suitable reservoir and closed system can be provided or the outward passage can simply vent the fluid to the atmosphere.

This fluid suitably cools the extruded tubing and solidifies it to a sufficient extent to render it non-tacky and dimensionally stable. Given just this function, the tube of extruded thermoplastic material would freely expand according to the pressure applied by the internal fluid as a function of the cooling rate applied and inherent liquid strength of the thermoplastic material in use. The apparatus and process of the instant invention goes further than simply controlling cooling rate and thereby attempting to control rate and type of expansion of the extruded tubing. The particular configuration of the apertures referred to above causes the fluid flowing out of them into a jet pump effect with respect to the space between cooperating aperture pairs whereby forming a significant vacuum and thus drawing the extruded thermoplastic tubing toward the configuration imposition means and causing the extruded tubing to conform closely to the shape of this configuration imposition means where the two are juxtaposed. If the temperature and flow rate of the external fluid are adjusted in consideration of the particular thermoplastic being extruded and in consideration of the dimensions of the extruded tube as well as the annular extrusion die, the frost line of the extruded tubing can be positioned within the configuration imposition means, generally toward the downstream end thereof.

It should be clear that many of the processing variables are interdependent and are not independently definable. The crux of this invention is to impose a particular rate and shape of expansion upon an extruded tube of thermoplastic material while cooling the extruded molten tube to a dimensionally stable and non-tacky condition. It has been found that the shape imposed during such expansion and cooling generally is diverging and has a maximum divergence angle of less than about 48° preferably less than about 38°. Further, it has been found that for any given process with a given frost line to extrusion die distance, it is preferred to operate according to this invention with an imposed bubble shape and size such that the neck of the bubble that is the part of the bubble from the die until it starts to diverge, is longer than in conventional, non-shape controlled extruded bubbles to such an extent that the divergent point is higher by about 5 to 15 percent of the total die to frost line distance. The gauge variation in film thus formed is significantly reduced as compared to the gauge variation observed under otherwise substantially identical processing conditions without imposing such a specific shape prior to solidifying the extruded film.

The thermoplastic material extruded into a tube according to this invention may be a polyolefin such as polyethylene, polypropylene, polybutene-1, copolymers of two or more of these with or without other olefins, polyvinyl or vinylidene chloride, vinyl or vinylidene chloride copolymers with acrylates, acrylonitrile, olefins and the like, acrylic homo and/or copolymers, styrene homo and/or copolymers, and in general, such other polymeric materials as are conventionally melt extruded into film form.

The thermoplastic is usually extruded through an annular die having a diameter of about 0.5 to 16 inches and a die gap of about 0.010 to 0.100 inch. Extrusion rates are of course dependent upon the extruder used, however, flow rates of about 2 to 50, preferably 4 to 12, pounds per hour per inch of final bubble circumference can be easily maintained within the parameters of the practice of this invention. Blow up ratios, that is, the ratio of final film diameter to die diameter, on the order of about 1.5 to 5 are suitable as are final film thicknesses of about 0.4 to 10 mils. The preferred internal pressurizing fluid and external cooling fluids are air, however, other similarly acting relatively inert gases can be used. The internal fluid should be maintained at about or slightly above atmospheric pressure. The external fluid should be maintained at a temperature of about 0° to 200°F and be fed at a rate of about 75 to 600 SCFM per square foot of surface area of the molten tubing being cooled. It is within the scope of this invention to provide means within the island portion of the extrusion die means to extract some or all of the air injected into the extruded tube so as to form a flowing system of air.

The configuration imposition means may be composed of a single monolithic structure of such height as to extend from the plane of the annular extrusion die to downstream of the frost line, or it may be series of stacked rings of similar cumulative height. In either case, the aperture row pairs should be spaced about one-sixteenth to three-fourths inch apart with the two rows in each pair spaced about one-half to 4 inches apart. The apertures themselves and the channels related thereto should preferably be in radial planes respectively and should be spaced apart about 2 to 6 aperture diameters apart in each row and the channel pairs should diverge about 50° to 160°, preferably 100 to 150°. The air return means between aperture row pairs should be about ⅛ to ½ inches wide so as to permit ready flow of the air back from the extruded tubing. It should be noted that the velocity and/or temperature of the external air can be substantially constant, at all aperture positions or it may be profiled in either or both regards as processing conditions dictate.

Referring now to the drawing, suitable thermoplastic resin 10 is fed to an extruder 12 in which it is plastified and then extruded through an annular die 14 into a tube 16 of molten thermoplastic material. Means 18, in the island 20 of the annular die, 22 are provided for feeding a fluid, suitably air, into the thermoplastic tube 16. As the tube proceeds downstream it cools until, at a frost line 24, it solidifies into a dimensionally stable tubular structure 26. The solid tube 26 is collapsed by a guide 28 and then passes through the nip of a pair of take off rollers 30 from whence it is taken to other processing (not shown) or is sold as such.

There are provided multiple rings 32a, 32b, 32c, 32d, 32e, 32f and 32g which are either separate entities in a housing 34 as shown or may be an equivalent single monolithic structure. A pump 36 feeds a fluid, suitably air, through a manifold 38 into the interior 40 of the rings 32. This fluid is then impinged upon the extruded tubing 16 and 26 respectively through the diverging channels 42a and 42b via apertrues 43 whereby creating a decreased pressure between them (in the area designated 44) and forcing this fluid to pass out of the system through passages 46 between adjacent rings. The high velocity fluid leaving the proximity of the extruded tube also causes a slight decrease in pressure (in the area designated 48). These pressure drops draw the still molten extruded tube 16 toward the rings 32 but the ejecting fluid forms a cushion between the rings and the tubing so as to prevent the tubing from contacting the rings and getting hung up on them while still in the molten condition.

What is claimed is:

1. In the process of producing thermoplastic film by melt extruding a seamless tube of thermoplastic material from an annular die orifice, increasing the pressure inside said tube upon extrusion; biaxially expanding said tubing as a result of increasing said pressure; cooling said extruded tubing to a solid state and flattening said expanded, cooled tube utilizing a pair of rotating draw rollers so as to entrap fluid between said flattening and said annular die orifice; the improvement of which comprises drawing said expanding extruded tubing outwardly to a greater extent utilizing a vacuum created by a plurality of pairs of superimposed diverging air streams surrounding said tubing, said air from said air streams being exhausted through annular openings located intermediate said divergent pairs of air streams, and conforming said expanding tubing to a substantially diverging function having a maximum angle of divergence of less than 48°.

2. An improved process as claimed in claim 1 wherein said thermoplastic is polyethylene, said extrusion is at a rate of about 2 to 50 pounds per hour per inch of final bubble circumference and at a blow-up ratio of about 1.5 to 5.

3. An improved process as defined in claim 1 wherein said pressure inside said tube comprises an internal pressurizing fluid and said cooling comprises a cooling fluid both of said fluids comprising air.

4. An improved process as claimed in claim 3 wherein said external air is about 0° to 200°F and is fed at a flow rate of about 75 to 600 SCFM per square foot of molten tube surface area, and said internal air is at slightly superatmospheric pressure.

* * * * *